United States Patent [19]

Sunderhaus et al.

[11] Patent Number: 5,141,020

[45] Date of Patent: Aug. 25, 1992

[54] EMERGENCY VENT VALVES FOR STORAGE TANKS

[75] Inventors: Charles A. Sunderhaus, Hamilton; Chester W. Wood, Milford, both of Ohio

[73] Assignee: Dover Corporation, New York, N.Y.

[21] Appl. No.: 768,178

[22] Filed: Sep. 30, 1991

[51] Int. Cl.5 .............................................. F16K 17/19
[52] U.S. Cl. ................................... 137/467; 137/521; 251/297
[58] Field of Search ...................... 137/467, 527.6, 521, 137/527, 527.4, 527.8, 587; 251/297

[56] References Cited

U.S. PATENT DOCUMENTS

| | | | |
|---|---|---|---|
| 889,780 | 6/1908 | Gibney | 251/297 X |
| 2,852,037 | 9/1958 | Downing et al. | 251/297 X |
| 3,687,157 | 8/1972 | Whitmer | 137/527 |
| 4,109,819 | 8/1978 | Kushman et al. | 137/527 X |
| 4,788,999 | 12/1988 | Dalpane | 137/521 X |

Primary Examiner—Stephen M. Hepperle
Attorney, Agent, or Firm—Kinney & Schenk

[57] ABSTRACT

An emergency vent valve for fuel storage tanks comprises a body member and a cover pivotally mounted thereon. The body member has a central passage which is sealed by cover in its closed position. The cover is held in this closed position by resetable latch means, which are responsive to a predetermined storage tank, vapor pressure to release the cover for displacement to an open position. In the open position, the cover is generally upright to provide an alert that the valve has been actuated. The latching means comprise a latch pin, mounted on the cover and a latch link, pivotal on the body member, having a cam surface, which is engaged by the latch pin to hold the cover in its closed position. A screw enables adjustment of the initial position of the latch link to vary the relative angle between the cam surface and the latch pin, to thus adjust the vapor pressure to which the valve is responsive.

14 Claims, 3 Drawing Sheets

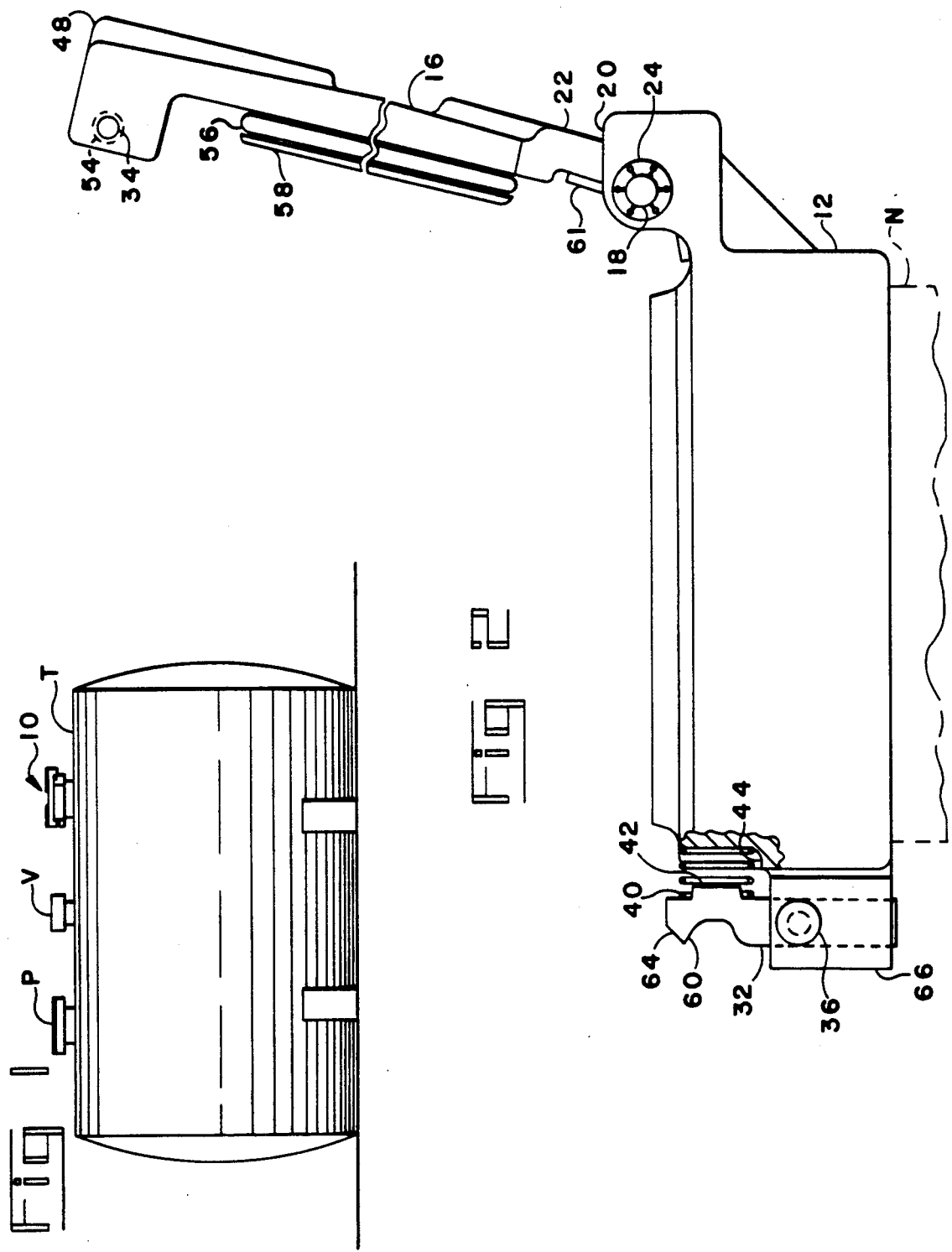

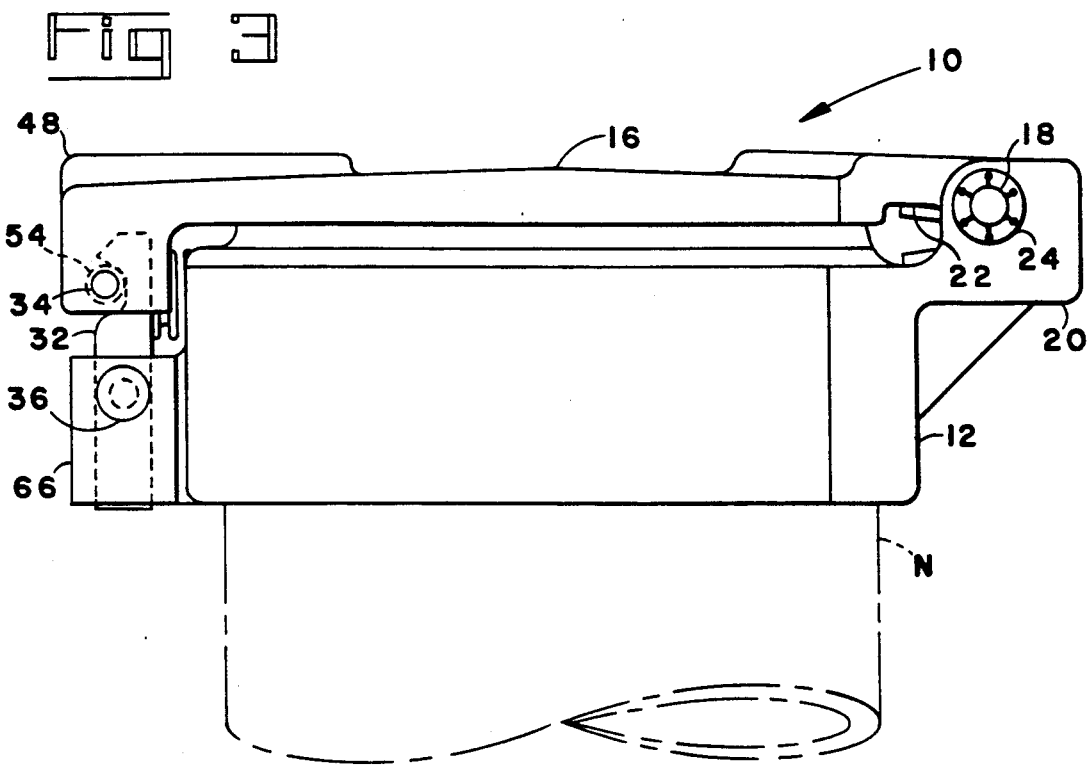
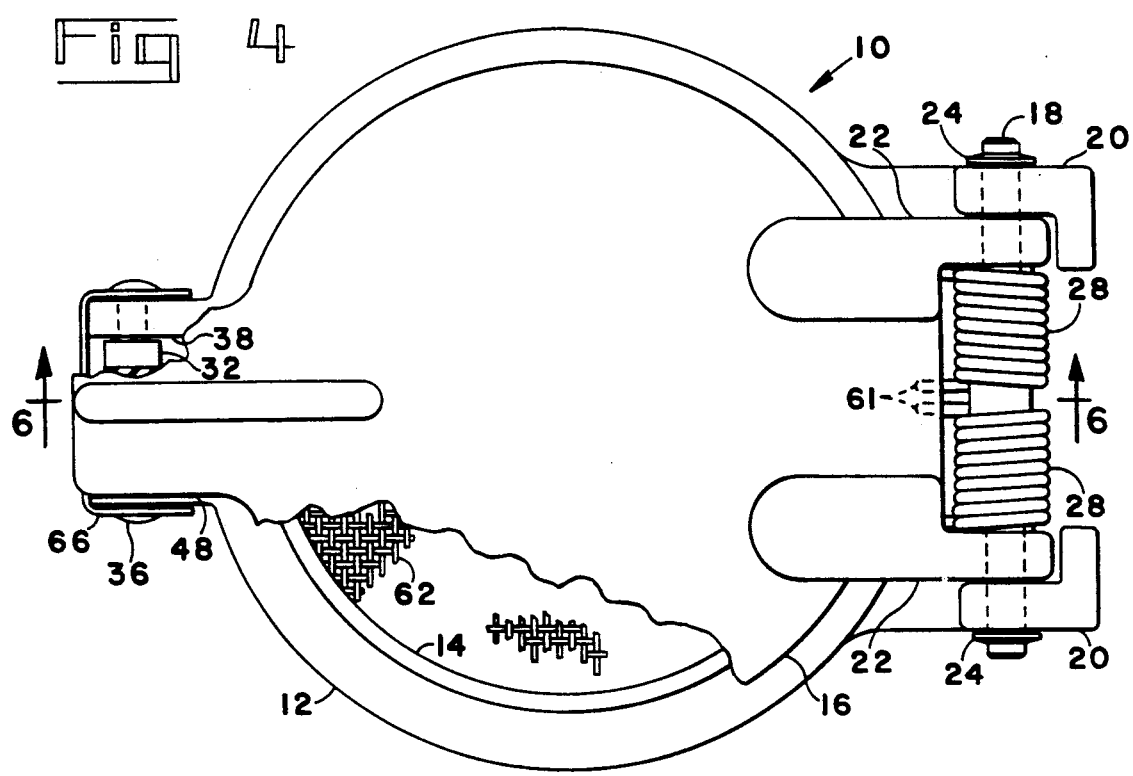

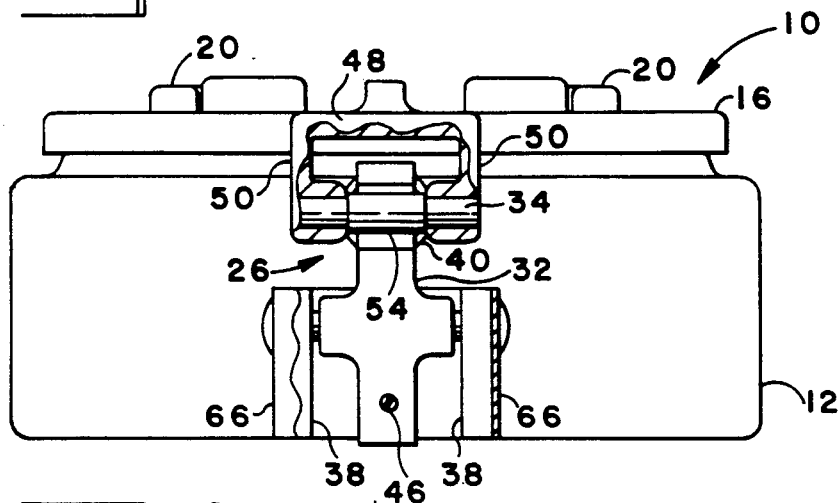
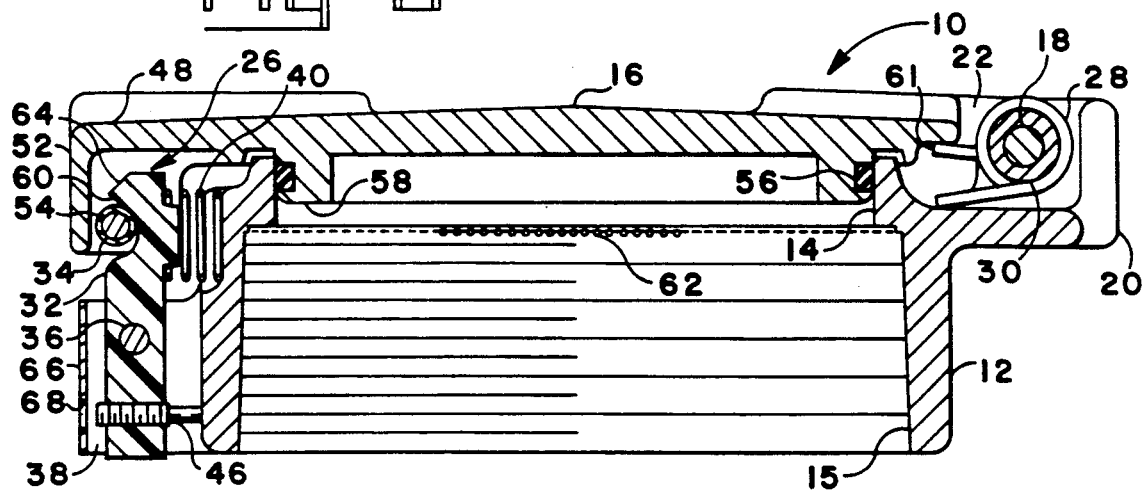
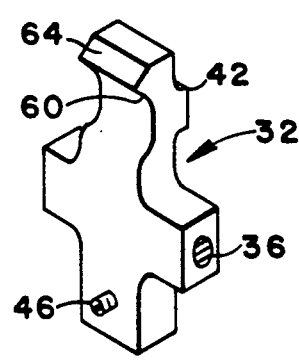

EMERGENCY VENT VALVES FOR STORAGE TANKS

The present invention relates to improvements in emergency vent valves for bulk storage tanks and other potentially hazardous liquids.

The present invention is directed, but not necessarily limited, to the storage of bulk quantities of gasoline, and other petroleum based fuels, in above ground tanks. More specifically, the field of primary interest is above ground storage tanks, from which fuel is withdrawn in the retail sale of fuel, the tanks then being periodically refilled from a tank truck.

It is a basic proposition that, as fuel is introduced into and withdrawn from a storage tank, that there will be changes in the vapor pressure within the tank. It is also basic that such vapor pressure is a function of ambient temperature. As compared to underground tanks, above ground storage tanks are subject to large swings in ambient temperature. It is also to be recognized that, above ground tanks can be subject to extremely high ambient temperatures, in the event of a fire in an adjacent area.

The point being made is that elevated temperature conditions have the potential of increasing the vapor pressure within the tank to a point where the tank will rupture. A tank rupture is potentially hazardous under any condition and, should it occur when a fire is in progress, the consequences are potentially catastrophic.

The problems associated with vapor pressure variations in storage tanks, and above ground storage tanks, in particular, are well recognized and venting valves are provided for regulating the vapor pressure in a tank. Such pressure regulating vent valves prevent both an excessive overpressure condition and an excessive negative pressure condition, either of which could result in rupture of the tank. U.S. Pat. Nos. 4,212,315 and 4,712,283 disclose representative pressure regulating vent valves.

While pressure regulating vent valves have a high degree of reliability, the potentially catastrophic consequences of a tank rupture from an overpressure condition, particularly as a result of a fire, has prompted the provision of emergency vent valves. Such emergency vent valves open in response to an increase in the tank's vapor pressure above the maximum permitted by the pressure regulating vent valve, but below a pressure which would cause the tank to rupture.

The differential between these two pressures is, in many cases, relatively small. This means that the pressure to which emergency vent valves are responsive is critical and must be accurately predetermined, in order to assure opening of the emergency vent valve prior to reaching an unsafe pressure condition, without opening before that unsafe condition is reached.

An accepted approach for obtaining the required accuracy in actuating this type of emergency vent valve, is to employ a valve, which is held in a closed position by a frangible pin. Such frangible pins can be fabricated so that they will fracture within a narrow range of pressure, to the end that the vent valve will open when vapor pressure in the storage tank reaches a predetermined upper limit, but not until that limit is reached.

The frangible pin, emergency vent valve is highly reliable. However, if an overpressure condition occurs and the vent valve opens, it is necessary to employ a new frangible pin in order to again make the emergency vent valve operational. This requirement leads to abuse in that a nail, or other metal pin, can be substituted for the frangible pin to reclose the emergency vent valve. When this is done, the safety function of the emergency vent valve is defeated.

Accordingly, the primary object of the present invention is to provide a resetable emergency vent valve for preventing a vapor overpressure condition in fuel storage tanks and similar vessels.

Another object of the present invention is to provide means for alerting an attendant that the emergency safety valve has been actuated.

A further object of the present invention is to minimize manufacturing costs for such emergency vent valves.

The foregoing ends are broadly obtained by a valve which comprises a body member, adapted to be mounted on a fuel storage tank, with a central passage in communication is the upper portion of the tank. A cover is pivotally mounted on the body member and is displaceable from a closed position, in which it overlies and seals the central passage, to an open position in which vapor will be vented. The cover is releasably maintain in its closed position by resetable latch means.

In accordance with one aspect of the invention, the cover has a generally vertical, upright, open position and spring means are provided to displace the cover to this upright position, thereby providing an alert that the valve has been actuated by an overpressure condition. The cover may have a distinguishing color indicia to further alert that an overpressure condition has occurred.

Various features are provided to enable the valve to be responsive to a precise vapor pressure in the storage tank. These features include employing a latch link pivotally mounted on the body member and latch pin, mounted on the cover, as components of the resetable latching means. The latch link includes a cam surface engageable with the latch pin. Spring means, acting on the latch link, resiliently urge this cam surface into engagment with the latch pin. Shroud means may be provided on the cover to protect the engaging portions of the latch link and latch pin from debris, which might impede release of the latch pin from the latch link.

The latch link may be provided with a second cam surface which is engaged by the latch pin, when the cover is swung from its open to its closed position. Such engagement pivots the latch link for engagement of the latch pin with the first cam surface, to hold the cover in its closed position. Means may be provided for adjusting the initial position of the latch link to vary its angular relationship with the latch pin, and thus properly position the second cam surface for engagement by the latch pin.

The above and other related objects and features of the invention will be apparent from a reading of the following description of a preferred embodiment, with reference to the accompanying drawings, and the novelty thereof pointed out in the appended claims.

IN THE DRAWINGS

FIG. 1 is a simplified elevation of a fuel storage tank on which the present emergency vent valve would be mounted;

FIG. 2 is an elevation of the emergency vent valve in its open position;

FIG. 3 is an elevation of the emergency vent valve in its closed position;

FIG. 4 is a plan view, with portions broken away, of the emergency vent valve in its closed position;

FIG. 5 is an elevation of the left side of the emergency vent valve, as viewed in FIG. 3, with portions broken away, FIG. 6 is a section taken generally on line 6—6 in FIG. 4; and FIG. 7 is perspective view of a latching element.

FIG. 1 illustrates the environment in which the present vent valve is used, and, further, the specialized, specific purposes that it serves.

Reference character T indicates a fuel storage tank, which is mounted above ground. The tank T can be used to supply fuel to dispensing units in the retail sale of gasoline and other fuels. The tank T is periodically filled with fuel, as from a fuel transport truck, through a fill pipe P.

The vapor volume in the tank T is subject to wide variations as fuel in withdrawn from and then introduced into the tank. To prevent such volumetric variations from causing either a positive or negative pressure, which would rupture the tank, various venting means are provided, including a vent valve V. The vent valve V also regulates the vapor pressure within the tank T, to prevent excessive positive or negative pressure variations as a result of ambient temperature variations. Such pressure regulating vent valves are well known and exemplified by the valves disclosed in the above reference U.S. patents.

In addition, to the pressure regulating vent valve V, an emergency vent valve, indicated generally by reference character 10, is also mounted on the top of the tank T. The emergency vent valve 10 functions to prevent the vapor pressure in the tank T from exceeding an unsafe level, in the event of circumstances which prevent the valve V from providing that function. The valve V normally maintains the vapor pressure in the tank T at a given maximum level, representatively 2.0 psig. The normally closed emergency vent valve 10, opens when tank pressure exceeds that level by a given increment. The emergency vent valve 10 opens at a pressure level, which is insufficient to cause rupture of the tank T, say 2.5 psig.

The structure and function of the valve 10 will now be described with reference to FIGS. 3-6.

The valve 10 comprises a body member 12, which has a central venting passage 14. The body member 12, has, at its lower end, a pipe thread 15, to enable is attachment to a pipe nipple N, which is connected to the tank T and communicates with the interior of the tank. A cover 16 is pivotally mounted on the body member 12 by a pin 18, which extends between ears 20 and through lugs 22, extending from the cover 16. Friction push nuts 24 axially position the pin 18 relative to the ears 20.

In its normally closed position, the cover 16 overlies the upper end of the passage 14 and is held in this position by latching mechanism 26. The cover is resiliently urged towards an open position by a pair of torsion springs 28, which are coiled about bushings 30, on pin 18, and effective between the body member 12 and cover 16.

The latching mechanism 26 comprises a latch link 32 and a latch pin 34. The latch link 32 is pivotally mounted on a pin 36, which extends between ears 38, projecting laterally from the body member 12. The latch link 32 is urged in a counterclockwise direction by a spring 40, disposed between the latch link 32 and the body member 12. Preferably, the spring 40 is positioned by a lug 42, on latch link 32 and a recess 44 in body member 12, see also FIG. 2. The counterclockwise position of the latch link 32 is adjustably limited by a screw 46, threaded through its lower end and engaging the body member 12.

The latch pin 34 is mounted on a projection 48, specifically extending between ears 50, which project downwardly therefrom. The projection 48 also has a downwardly projecting flange 52 (FIG. 6), connecting the ears 50. There is thus provided a protective shroud, which defines a chamber for the engaging surfaces of the latch link 32 and the latch pin 34. This protective chamber inhibits dust, and the like, from collecting on the reactive surfaces between the latch link 32 and latch pin 34, to the end of assuring opening of the cover at the desired tank pressure. To the same end, it is also preferred that the operative surface of the latch pin being in the form of a roller sleeve 54 rotatable thereon and captured between the ears 50. To the same end, it is further preferred that the roller sleeve 54 be formed of a low friction material, delrin synthetic resin being suitable.

In its closed position, the cover 16 seals the upper end of the passage 14 to normally prevent the escape of vapor from the tank T. This seal is, preferably of an axially telescoping type, being provided by an O-ring 56, mounted in a groove in a plug-like projection 58 formed on the lower surface of the cover 16. Actually, the cover 16 is pivotally mounted relative to the passage 14. However, in the closed position of the cover, relative movement of the O-ring 56 is essentially axial of the passage 14 over the range of movement in which the O-ring sealingly engages the passage 14.

Reference is now specifically made to the forces, acting on the cover 16, relative to its venting function. First, there is the force of springs 28, which tends to pivot the cover 16, in a clockwise direction, to an open position. This force is resisted by the effective downward force provided by a cam surface 60, on latch link 32, being engaged by the latch pin roller 54. This downward force is further a function of the force of spring 40. In order for the cover 16 to be opened, the vapor pressure force on the cover 16 must exceed the difference between these opposing forces. The vapor pressure force is a function of the undersurface of the cover 16, as well as the pressure itself.

The magnitude of such forces may be readily obtained, by one skilled in the art, either empirically, or by calculation.

In connection with the opening force, provided by torsion springs 28, it is to be noted that the preferred use of two springs enables that force to be exerted on the cover 16 diametrically opposite to the latching means 26. This is to point out that the ends 61 of these springs are disposed centrally of the cover pivot pin 18 (FIG. 4). This minimizes the possibility of binding forces, which might prevent unlatching of the cover when the tank vapor pressure reaches the preset limit at which venting is desired.

In any event, when the vapor force on the cover 16, provides a force sufficient to exceed the differential forces (of the springs 28 and the latching mechanism 26) the roller 54 will ride up the cam surface 60 and become disengaged from the latch link 32. The cover 16 will then be positively swung to an open position by the springs 28. The cover lugs 22 engage the body member ears 20 to maintain the cover 16 generally upright in its open position. This upright position provides a visible indicia to a worker that the emergency vent valve has been actuated. Being so alerted, the worker will be aware of the need to check the cause of a tank overpressure condition and to take corrective action, as may be required, such as repairing, or replacing the pressure regulating vent valve V. It is also preferable to provide the cover 16 with a highly visible color, such as red, to further alert a worker that the emergency vent valve has been actuated.

A further feature is found in the provision of a screen 62 which extends across the passage 14, being clamped against the body member 12, when it is threaded onto the nipple N. The screen 62 prevents debris from entering the tank T, when the cover 16 is open.

After the emergency vent valve 10 is actuated to an open position, by an overpressure condition in the tank T, and any necessary corrective action taken, the cover 16 may be sung to its closed position and reengaged with the latching mechanism 26. Such closure is facilitated by a cam surface 64, formed on the upper end of the latch link 32. The latch pin roller 54 engages the cam surface 64, as the cover 16 is swung in a counter-clockwise direction, displacing the latch link clockwise, so that the roller will engage the cam surface 60 and be held thereby in the closed position.

Thus, the emergency valve 10 is may be repeatedly reset to provide the desired venting function at a predefined tank pressure.

In the initial assembly of the latching mechanism 26, the latch link 32 is angularly adjusted by screw 46 to properly position the second cam surface 64 for engagement by the latch pin 34, when the cover 16 is swung from its open position to its closed position.

The reliability of the present emergency venting valve is further enhanced by the provision of a U-shaped shield 66 which embraces and spans the body member ears 38. The pin 36 may take the form of a rivet, which passes through the shield 66 and ears 38, with its ends providing heads to hold the shield 66 and latch link 33 in assembled relation. The shield 66 protects the lower end of the latch link 32 from abuse, which might interfere with its release function. An opening 68 in the shield 66 is aligned with the screw 46 to permit the above described adjustment of the angular position of the latch link 32. Once properly adjusted, it is not normally contemplated that further adjustment would be necessary.

It is to be noted that, as related to certain aspects of the invention, the purposes served by the referenced use of a latch pin (34/54) could be also be provided by a latching abutment, or equivalent projection.

This and other modifications of the preferred embodiment, as above described, will occur to those skilled in the art, within the spirit and scope of the present inventive concepts. Accordingly, the invention is defined by the following claims.

Having thus described the invention, what is claimed as novel and desired to be secured by Letters Patent of the United States:

1. An emergency vent valve for preventing an overpressure condition in a fuel storage tank, or similar closed vessel, said valve comprising a body member having a central passage and adpated to be mounted on a storage tank with the passage in communication with the upper portion of the tank, a cover pivotally mounted on said body member and having a closed position in which it overlies and seals said passage and an open position in which vapor may escape through the central passage, and resetable latching means for maintaining said cover in its closed position, said latching means being responsive to a vapor pressure force on the portion thereof overlying the central passage to release said cover from its closed position and permit its displacement to its open position, wherein the cover is pivotally mounted on one side of the body member and disposed in a generally horizontal position in its closed position, and the latching means is disposed on the opposite side of the body member and said latching means comprises, a generally vertically disposed latch link, pivotally mounted on the body member and a latch pin mounted on the cover and releasably engageable with the latch link.

2. An emergency vent valve as in claim 1 wherein the cover has a projecting downwardly open shroud, spanned by said latch pin, and enclosing the upper end of the latch link, in the closed position of the cover.

3. An emergency vent valve as in claim 1 further comprising spring means urging said cover towards its open position, said latch link has an angled cam surface engaged by said latch pin in the closed position of the cover, link spring means urging said cam surface into a position overlying the latch pin and providing a yieldable force resisting disengagement of the latch pin therefrom.

4. An emergency vent valve as in claim 3 wherein the central passage comprises a cylindrical bore portion disposed generally in the horizontal plane of axis for pivotally mounting said cover, the cover has a plug like projection, which enters into said cylindrical bore portion, in the closed position of the cover, said projection having an annular groove, an O-ring is disposed in said annular groove and sealingly engages said cylindrical bore portion, in the closed position of the cover.

5. An emergency vent valve as in claim 4 wherein the latch pin is disposed outwardly from said latch link, and the cover has a projecting downwardly open shroud, spanned by said latch pin, and enclosing the upper end of the latch link, in the closed position of the cover, 6. An emergency vent valve as in claim 5 wherein the body member comprises a pair of ears between which the latch link is disposed, a link pivot pin spans said ears and provides a pivotal mounting for said latch link.

7. An emergency vent valve as in claim 6 wherein a roller sleeve is mounted on the latch pin to provide rolling contact between the latch pin and the latch link cam surface.

8. An emergency vent valve as in claim 6 wherein the pivotal mounting of the cover comprises a pair of ears projecting from the body member and lug means projecting from said cover and a cover pivot pin extending through said lugs and ears, and the spring means urging the cover towards its open position comprise.

torsion spring means mounted on said cover pivot pin.

9. An emergency vent valve as in claim 8 wherein the torsion spring means comprise two torsion springs, each having an end engaging the cover and exerting an opening force thereon, generally centrally of the cover, opposite the latching means.

10. An emergency vent valve as in claim 8 wherein said cover is generally upright in its open position, and said cover lugs are engageable with the body member ears to limit pivotal movement of the cover to said upright, open position, thereby providing an alert that the emergency valve has been actuated.

11. An emergency vent valve as in claim 6 further comprising a shield mounted on the outer ends of the body member ears and protecting said latch link.

12. An emergency vent valve as in claim 4 wherein a screen spans said central passage beneath said cylindrical bore portion, and said central passage further comprises thread means, beneath said screen, for mounting the emergency vent valve on a fuel storage tank.

13. An emergency vent valve as in claim 3 wherein the latch link further comprises a second, upwardly facing cam surface, said second cam surface being engageable by the latch pin when the cover is pivoted from its open position toward its closed position, to thereby pivot the latch link and permit the latch pin to be engaged by the first mentioned cam surface.

14. An emergency vent valve as in claim 13 further comprising means for adjusting the initial angular position of the latch link to thereby properly position said second cam surface for engagement by the latch pin.

* * * * *